United States Patent
Titlebaum et al.

(10) Patent No.: US 6,549,774 B1
(45) Date of Patent: Apr. 15, 2003

(54) DIGITAL AUDIO SERVICE SATELLITE RECEIVER HAVING SWITCHABLE OPERATING MODES FOR STATIONARY OR MOBILE USE

(75) Inventors: Joseph M. Titlebaum, Bethesda, MD (US); Robert L. Acker, Arlington, VA (US); David L. Brown, Lake Worth, FL (US)

(73) Assignee: XM Satellite Radio Inc., Washington, DC (US)

( * ) Notice: Subject to any disclaimer, the term of this patent is extended or adjusted under 35 U.S.C. 154(b) by 0 days.

(21) Appl. No.: 09/433,864

(22) Filed: Nov. 4, 1999

(51) Int. Cl.[7] .................................................. H04Q 7/20
(52) U.S. Cl. ....................... 455/427; 455/134; 455/132; 455/133; 455/135; 455/272; 455/277.1
(58) Field of Search ................................. 455/427, 134, 455/130, 132, 133, 135, 272, 277.1, 302

(56) References Cited

U.S. PATENT DOCUMENTS

| | | | |
|---|---|---|---|
| 4,422,041 A | * 12/1983 | Lienau ........................ 324/174 |
| 5,204,981 A | * 4/1993 | Karasawa et al. .......... 379/172 |
| 5,278,863 A | 1/1994 | Briskman ........................ 375/1 |
| 5,301,352 A | * 4/1994 | Nakagawa et al. ......... 455/132 |
| 5,319,673 A | 6/1994 | Briskman ........................ 375/1 |
| 5,446,922 A | * 8/1995 | Siwiak et al. ................ 455/135 |
| 5,485,485 A | 1/1996 | Briskman et al. ........... 375/200 |
| 5,592,471 A | 1/1997 | Briskman .................... 455/52.3 |
| 5,670,902 A | * 9/1997 | Nakagawa et al. ........... 327/99 |
| 5,720,039 A | 2/1998 | Lieberman .................... 455/10 |
| 5,745,839 A | 4/1998 | Lieberman .................... 455/10 |
| 5,794,138 A | 8/1998 | Briskman .................... 455/344 |
| 5,864,579 A | 1/1999 | Briskman .................... 375/200 |
| 6,009,307 A | * 12/1999 | Granata et al. ............. 455/13.3 |
| 6,208,636 B1 | * 3/2001 | Tawil et al. ................. 340/2.1 |

* cited by examiner

*Primary Examiner*—Daniel Hunter
*Assistant Examiner*—Andrew T Harry
(74) *Attorney, Agent, or Firm*—Roylance, Abrams, Berdo & Goodman, L.L.P.

(57) ABSTRACT

A satellite receiver is switchable between an operating mode wherein the receiver is capable of generating an output signal using received signals from one or a plurality of satellites, aid another operating mode wherein the receiver generates an output signal using signals received from only one satellite. The former operating mode is useful when the receiver is operating in a mobile environment. The latter operating mode is useful when the receiver is operating in a fixed environment. The receiver is configured to detect the mode in which it is operating. The receiver comprises at least two recevier arms for processing a broadcast signal from a selected one of two satellites. The receiver disables one of the arms when the receiver is stationary.

9 Claims, 7 Drawing Sheets

DIGITAL AUDIO SERVICE SATELLITE RECEIVER HAVING SWITCHABLE OPERATING MODES FOR STATIONARY OR MOBILE USE

CROSS-REFERENCE TO RELATED APPLICATIONS

Related subject matter is disclosed and claimed in co-pending patent U.S. patent application Ser. No. 09/263,207, filed by Stelios Patsiokas on Mar. 5, 1999; and in a co-pending U.S. patent application Ser. No. 09/310,352, filed by Anh Nguyen et al on May 12, 1999; both of said applications being expressly incorporated herein by reference.

FIELD OF THE INVENTION

The present invention relates to a method and apparatus for switching a satellite receiver between two operating modes depending on whether the receiver is stationary or mobile.

BACKGROUND OF THE INVENTION

Satellite digital audio radio service (SDARS), a satellite broadcast service established by the U.S. Federal Communications Commission (FCC), has been proposed using satellite transmission of digital audio programs to radio receivers. The radio receivers can be stationary receivers, in which case a receiver antenna can be pointed for optimal line of sight (LOS) reception from a satellite. In contrast, the position of the receiver antenna relative to the satellite changes with mobile receivers (e.g., a receiver that is hand-carried by a user or is mounted in a vehicle), and LOS reception from one satellite is not always available. Accordingly, mobile receivers are generally configured to receive broadcast signals from more than one satellite.

Service outages can occur in systems which broadcast data, video, audio and other information using radio frequencies. These outages can prevent receivers, and particularly mobile receivers, from receiving the broadcast service altogether, or cause them to receive a signal so degraded that the service is rendered unacceptable. These outages are generally due to physical blockage of transmission paths between the transmitter and receiver (e.g., due to mountainous terrain or long tunnels) and multipath fading and reflection of the transmission path. Satellite broadcast systems can use two transmission channels to provide diversity for mitigating service outages due to multipath, physical blockages and interference in mobile broadcast receivers. Terrestrial repeaters can also be provided to repeat satellite signals in geographic areas where LOS reception is obscured by tall buildings, hills and other obstructions.

The receivers are configured with first and second receiver arms for receiving signals transmitted from the respective satellites. The recovered data streams from the satellites can be used singly or optimally combined. In satellite systems that are reinforced with terrestrial repeaters, the receiver can also be configured for dual-mode operation to receive both satellite signals and terrestrial signals and to combine or select one of the signals as the receiver output. When the receiver is stationary, only one of the satellite signals is generally required. When the receiver is in a mobile environment, the option of using one or plural received satellite signals for output signal generation is advantageous, particularly when no terrestrial repeater signal is available.

SUMMARY OF THE INVENTION

In accordance with the present invention, a satellite receiver is switchable between an operating mode wherein the receiver is capable of generating an output signal using received signals from one or a plurality of satellites, and another operating mode wherein the receiver generates an output signal using signals received from only one satellite. The former operating mode is useful when the receiver is operating in a mobile environment (i.e., installed in a vehicle). The latter operating mode is useful when the receiver is operating in a fixed environment (e.g., installed at a user's home or otherwise operated at a stationary position).

In accordance with another aspect of the present invention, the receiver is configured to detect the mode (i.e., fixed or mobile) in which it is operating. The receiver comprises at least two receiver circuit arms. Each arm is configured for receiving, downconverting and demodulating a broadcast signal from a selected one of the satellites. The receiver is operable to disable at least a portion of one of the two arms when the receiver operating mode corresponding to fixed or stationary use is detected.

The mobile or fixed mode can be detected depending on whether the receiver is powered on via a DC power supply (e.g., 12 volts or greater from a vehicle battery via the cigarette lighter receptacle or power receptacle) or a residential power supply circuit (e.g., AC power or DC power of 9 volts), respectively. A circuit is provided to detect the signal level from the power source and operate a relay which selectively enables and disables components in respective receiver arms.

The mode can be detected depending on the position of a switch operated by a user. The receiver can also be operated in conjunction with a pedestal base which actuates a switch or detector in the receiver. The pedestal base is installed in a vehicle (e.g., on the dashboard of the vehicle). The switch or detector is actuated when the portable receiver is placed on the pedestal.

In accordance with yet another aspect of the present invention, the receiver is provided with a power supply sensor for determining if the receiver is operating in a stationary or mobile environment. The receiver is provided with an AC power port for connection via a power cord to an AC power outlet. The receiver is also provided with a DC power port for connection to a DC power source such as a car battery via the cigarette lighter receptacle or power receptacle. One or both of the ports can be provided with a mechanical, magnetic, electromagnetic, semiconductor, electronic or other type of switch or detector that is actuated when the port is connected to its corresponding power source.

In accordance with still another aspect of the present invention, the receiver can also be provided with a motion sensing device. The motion sensing device can be implemented as a vibration sensor (e.g., for sensing when the receiver is being subjected to vibrations induced by a vehicle engine or contact of the vehicle with a road surface), an encoding compass or heading indicator, an encoding gyroscopic device, a mercury switch device, among other devices.

In accordance with an aspect of the present invention, a satellite receiver is configured to be portable for use within a vehicle, as well as for stationary use. The receiver is provided with a vehicle antenna which can be affixed to a vehicle window, for example. The receiver is also provided with a separate antenna for use when the receiver is stationary. An operating mode determining device can be implemented using a mechanical, magnetic, electromagnetic, semiconductor, electronic or other type of switch or detector which is actuated when the stationary antenna is deployed and/or when vehicle antenna is connected to a vehicle antenna port on the receiver.

BRIEF DESCRIPTION OF THE DRAWINGS

The various aspects, advantages and novel features of the present invention will be more readily comprehended from the following detailed description when read in conjunction with the appended drawings, in which.

Throughout the drawing figures, like reference numerals will be understood to refer to like parts and components.

DETAILED DESCRIPTION OF THE PREFERRED EMBODIMENTS

Figure 1:
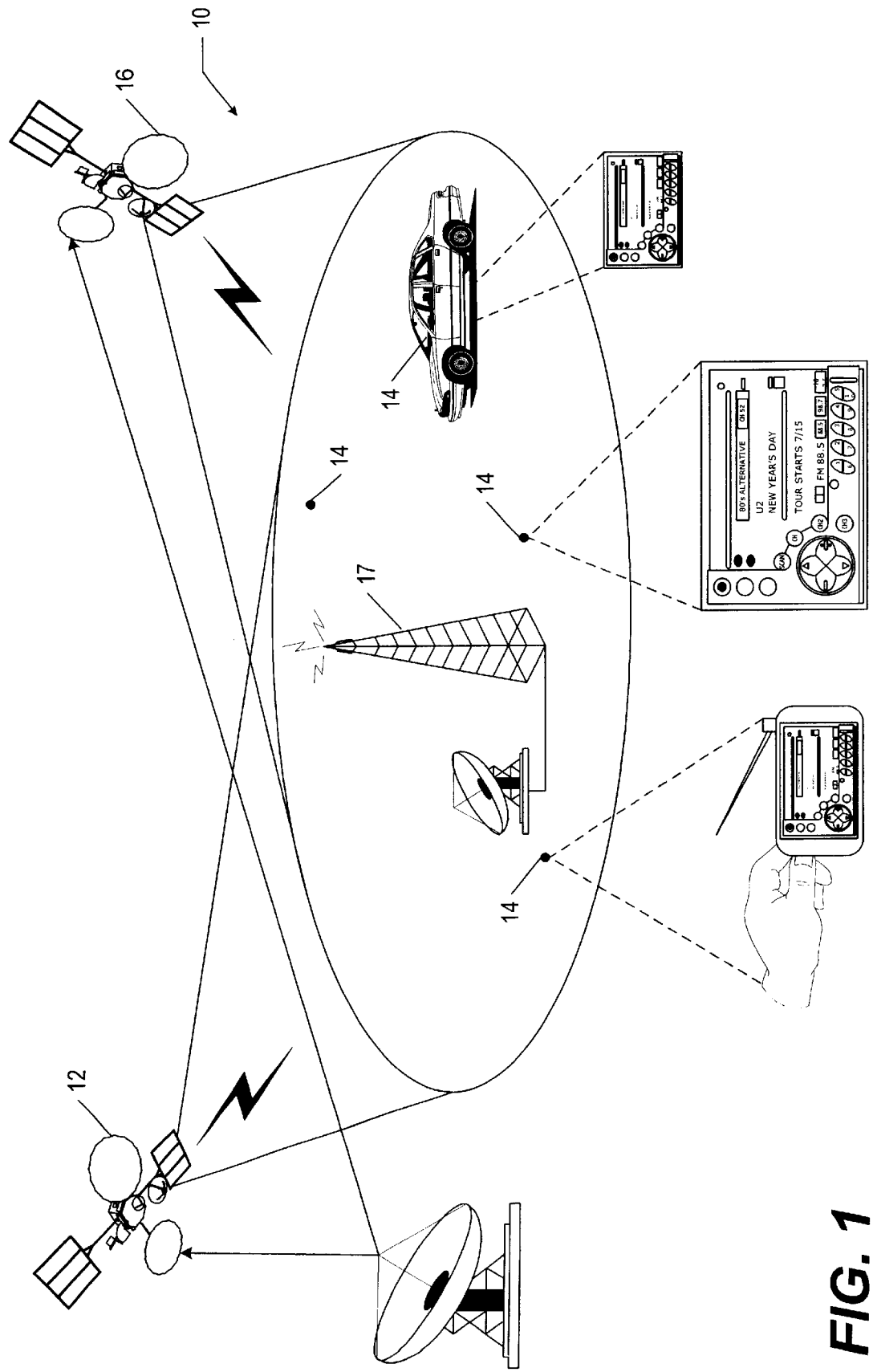
FIG. 1 illustrates a satellite broadcast system.

FIG. 1 depicts a satellite broadcast system 10 which comprises at least one geostationary satellite 12 for line of sight (LOS) satellite signal reception at receiver units indicated generally at 14. The satellite broadcast system 10 can be used for SDARS, for example. Another geostationary satellite 16 at a different orbital position is provided for diversity purposes. One or more terrestrial repeaters 17 can be provided to repeat satellite signals from one of the satellites in geographic areas where LOS reception is obscured by tall buildings, hills and other obstructions.

Figure 2:
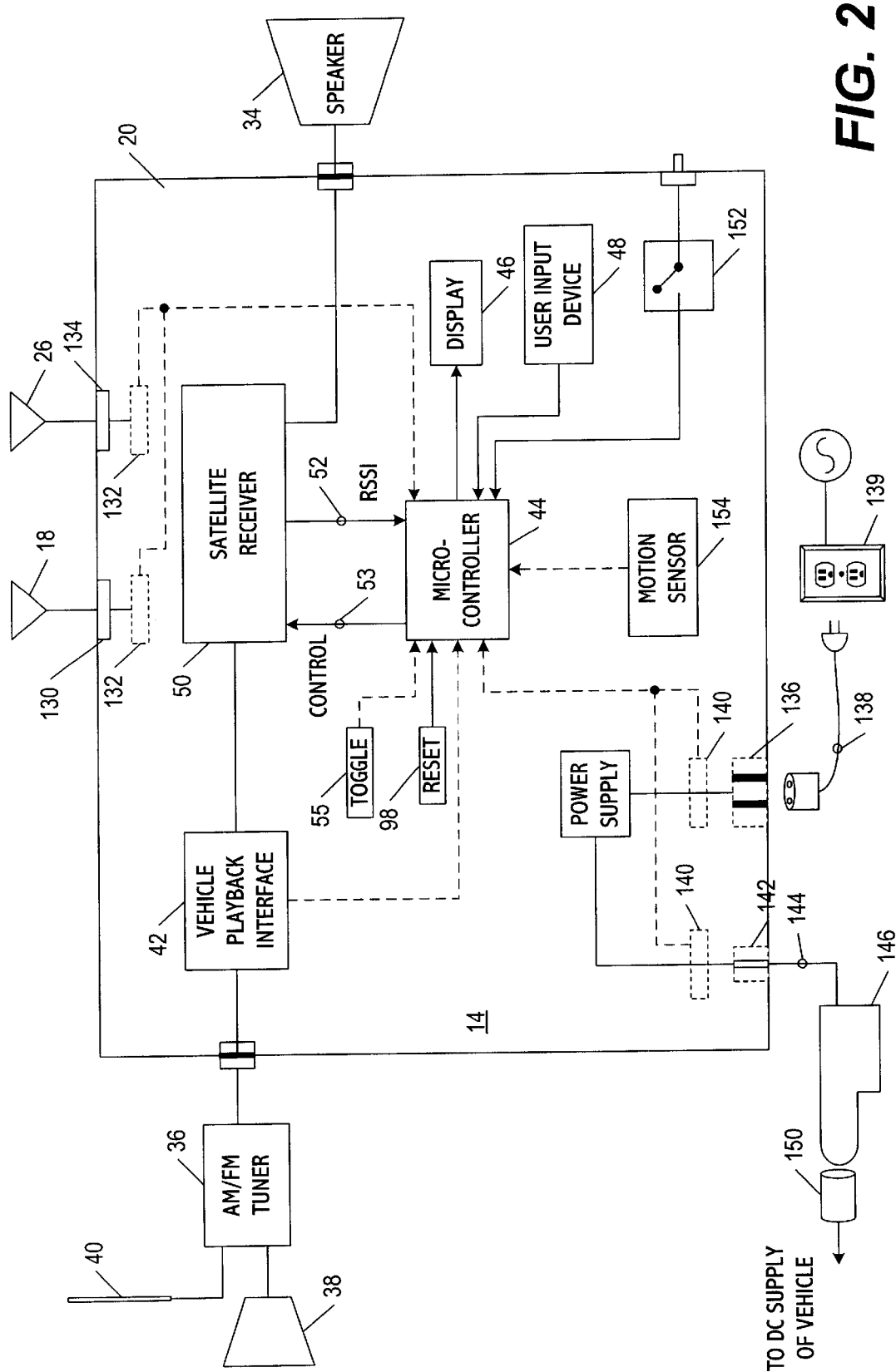
FIG. 2 illustrates a receiver unit constructed in accordance with an embodiment of the present invention.

A receiver unit 14 can be configured for stationary use (e.g., on a subscriber's premises), or for mobile use, or both. With reference to FIG. 2, a receiver unit 14 constructed in accordance with the present invention comprises at least one satellite antenna 18 for receiving signals from at least one of the satellites 12 and 16. The antenna 18 is, for example, a satellite S-band antenna operable at about 2.3 gigaHertz (GHz) for receiving satellite broadcast signals. As will be described below in connection with FIG. 4, the satellite antenna 18 is sufficiently broadband to receive first and second satellite channels from the satellites 12 and 16, respectively, on different frequencies. The antenna 18 is preferably detachable and is useful for operating the receiver unit 14 in a stationary environment and is directed and pointed for LOS signal reception with a satellite 12 or 16.

Figure 3:
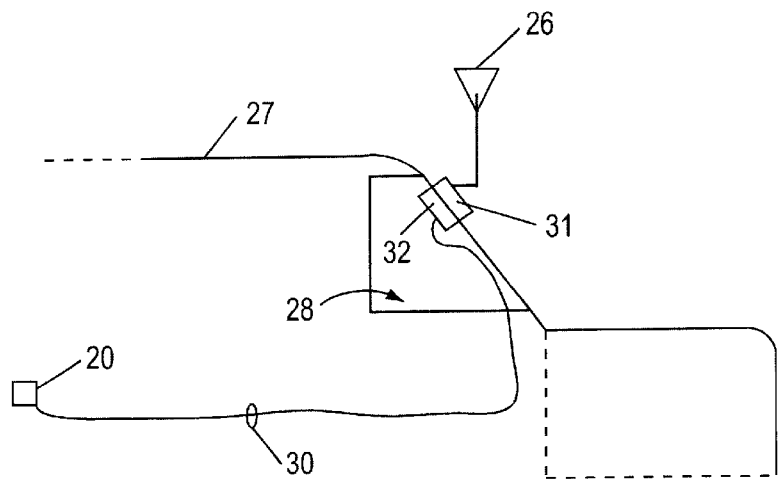
FIG. 3 illustrates an exemplary installation of the receiver unit depicted in FIG. 2 in a vehicle.

The antenna 18 is preferably connected to a chassis 20 containing other components of the receiver unit 14. With continued reference to FIG. 2, the chassis 20 is configured for detachable connection to a mobile antenna 26, that is, an antenna that can be mounted on a vehicle for mobile use. The antenna 26 and its associated circuitry (e.g., a low noise amplifier) can be connected internally or externally with respect to a vehicle. As shown in FIG. 3, the antenna 26 can be mounted on the roof 27 or rear window 28 of a vehicle 29, for example. A cable 30 connects the antenna 26 to the chassis 20. To avoid having to drill a hole in the truck or car 29 to install the cable 30, a device 31 can be mounted on the exterior of the vehicle's rear window 28 using an adhesive material. The device 31 supports the antenna 26 and contains any associated circuitry. The device 31 can be capacitively coupled with another device 32 which is connected to the cable 30. The other device 32 can be mounted on the inside of the window 28 opposite the first device 31 using the same adhesive material. Alternatively, the antenna 26 can be clipped onto a vehicle window as described in the co-pending U.S. patent application Ser. No. 09/317,947, filed May 25, 1999.

As shown in FIG. 2, the receiver unit 14 can be provided with one or more loudspeakers, indicated generally at 34, which are either detachable or integral with respect to the chassis 20. The loudspeakers are preferably detachable to allow the receiver unit 14 to be more portable and adaptable for use in a vehicle. When used in a vehicle, the receiver unit can playback received satellite broadcast programs via the AM/FM tuner 36, antenna 40 and vehicle loudspeakers 38 as described in the above-referenced co-pending U.S. patent application Ser. No. 09/263,207, filed Mar. 5, 1999, and in the above-referenced co-pending U.S. patent application Ser. No. 09/310,352, filed May 12, 1999, both of which are incorporated herein by reference for all purposes. Other methods of playing satellite broadcast programs via a standard audio system installed in a vehicle can be used. Depending on the method chosen, the received satellite broadcast program can be provided to the vehicle tuner 36 and loudspeaker 34 via a wireless or wireline link. An exemplary wireless link can be implemented by modulating the broadcast program on an open AM or FM frequency channel in the operating range of the tuner 36. An exemplary wireline link can be implemented by sending broadcast program signals on a DC power link, which also provides power from the vehicle DC power supply. The components in the receiver unit 14 for processing the received satellite broadcast signal for playback on the existing audio system of a vehicle are indicated in FIG. 2 at 42. These components and the exemplary links are described in the aforementioned co-pending applications.

As shown in FIG. 2, the receiver unit 14 is provided with a microcontroller 44, a display 46 and a user input device 48 such as a number of buttons and dials. The user input device 48 can comprise satellite broadcast channel selection buttons, as well as volume control and tuning buttons or dials. The microcontroller 44 can receive data from a satellite receiver 50 connected to the antenna 18 or 26. The data is received via an input line 52 and provides information relating to SDARS, which can include, for example, satellite broadcast channel number, artist name, audio program title and data channel information. The microcontroller 44 can also indicate via the display 46 the signal strength (i.e., RSSI) of satellite or terrestrially repeated SDARS signals, and visual effects (e.g., a dynamic bar graph display corresponding to the output levels of the audio program from the auxiliary audio source), among other displayable information.

The receiver unit 14 is configured for stationary use by pointing the antenna 18 to the satellite 12 or 16 which provides the best LOS reception and therefore the best satellite signal. The microcontroller 44 can be programmed to determine the strength of both of the satellite signals via the RSSI data received via the line 52 from the satellite receiver 50 and to select the strongest one of the satellite channels (i.e., receiver arms 54 and 56) for reception when operating in the stationary mode. The receiver unit 14 does not change satellite channels until it is powered down and then powered up again, in which case the operating mode remains unchanged from the previous mode before the receiver unit 14 was powered down. A reset button 98 can be provided which, when depressed, causes the microcontroller 44 to commence determining the strongest of the two satellite signals to lock onto. The microcontroller 44 can also be programmed to automatically default to one of the receiver arms 54 and 56 without reference to signal quality when in the stationary mode. A toggle button 55 can be provided to toggle between the two receiver arms 54 and 56 to allow a user to switch to the other receiver arm when sound quality deteriorates using the active receiver arm.

In the mobile operating mode, the receiver unit 14 is operable to dynamically select either one of satellite signals for output, or to combine the two satellite signals. Since terrestrial signals are typically stronger than received satellite signals, output signals from the receiver unit 14 can be generated using only the terrestrial signal in either the stationary or the mobile operating mode if terrestrial repeaters 17 are employed in the satellite broadcast system 10.

As described below in connection with FIGS. 4 and 5, the satellite receiver 50 comprises at least two receiver arms 54 and 56. In accordance with two embodiments of the present invention described below with reference to FIGS. 6 and 7, respectively, the satellite receiver 50 can be configured with one of two different and exemplary power detection devices for energizing a relay to selectively disable one of the receiver arms. Additional embodiments of the present invention are then described with further reference to FIG. 2 whereby the microcontroller 44 is programmable to receive input signals from one or more operating mode detection devices. The microcontroller 44 is operable in response to these input signals to generate control signals, as indicated at line 53, for transmission to the satellite receiver 50. The control signals are operable to disable a receiver arm 54 or 56 in the satellite receiver 50 using a corresponding switching device 58 and 60, as will now be described in connection with FIG. 4. For example, one of the arms 54 and 56 can be disabled when the receiver unit 14 is operating in a stationary environment.

Figure 4:
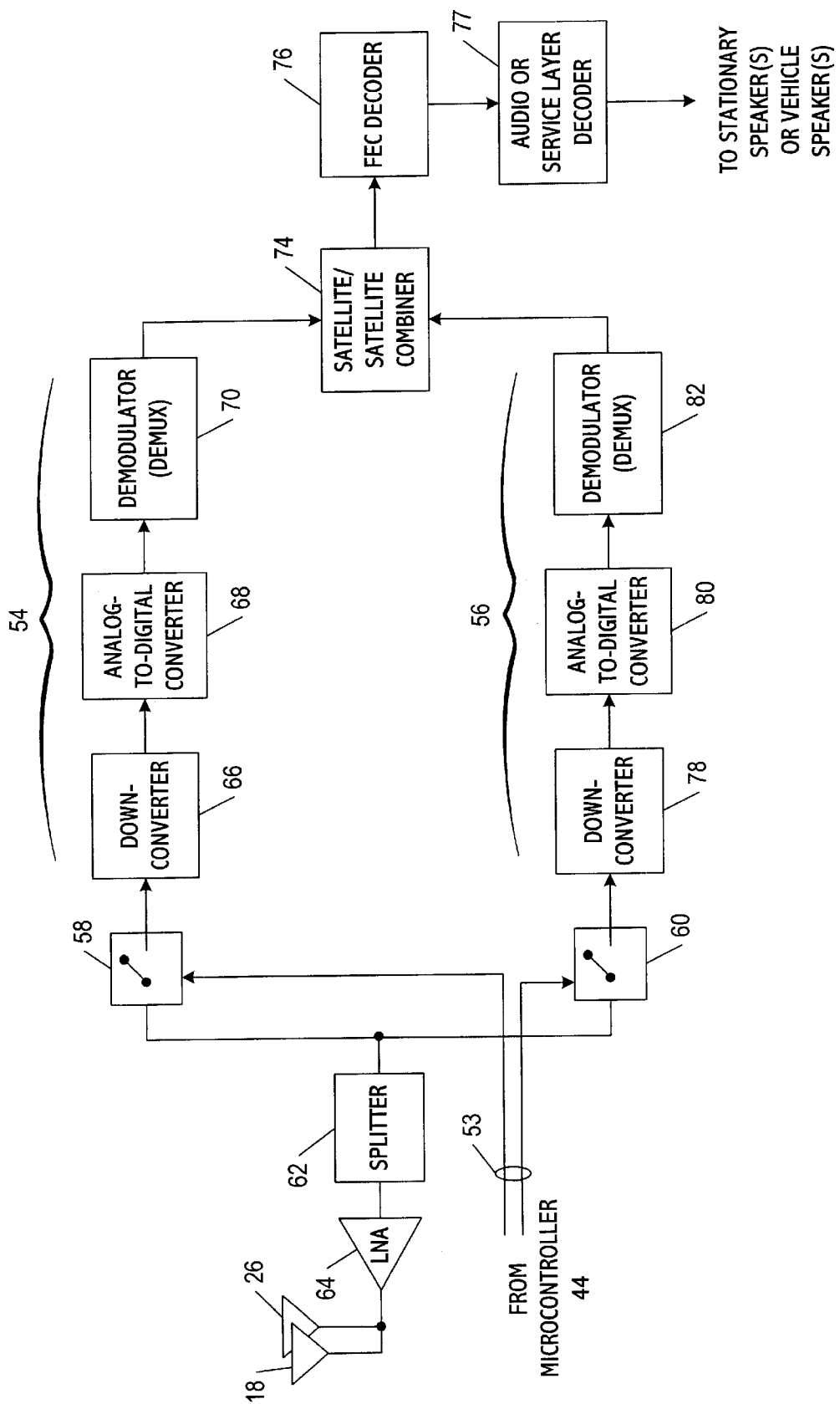
FIG. 4 is a block diagram of a two-arm satellite broadcast receiver for use with the satellite broadcast system depicted in FIG. 1 in accordance with an embodiment of the present invention.

As shown in FIG. 4, the receiver arms 54 and 56 each receive a signal from a splitter 62, following signal reception by the antenna 18 or 26 and amplification by a low noise amplifier (LNA) 64. The receiver arm 54 comprises a downconverter 66 and an analog-to-digital converter (ADC) 68. A demodulation device 70 is provided which can have a demultiplexing function for processing time division multiplexed (TDM) broadcast signals. Similarly, the receiver arm 56 comprises a downconverter 78, an ADC 80 and a demodulation device 82. The data streams from the two arms 54 and 56 are combined via a satellite-satellite combiner 74. The output of the combiner 74 is processed by a forward error correction (FEC) decoder 76 and an audio or service layer decoder 78.

Figure 5:
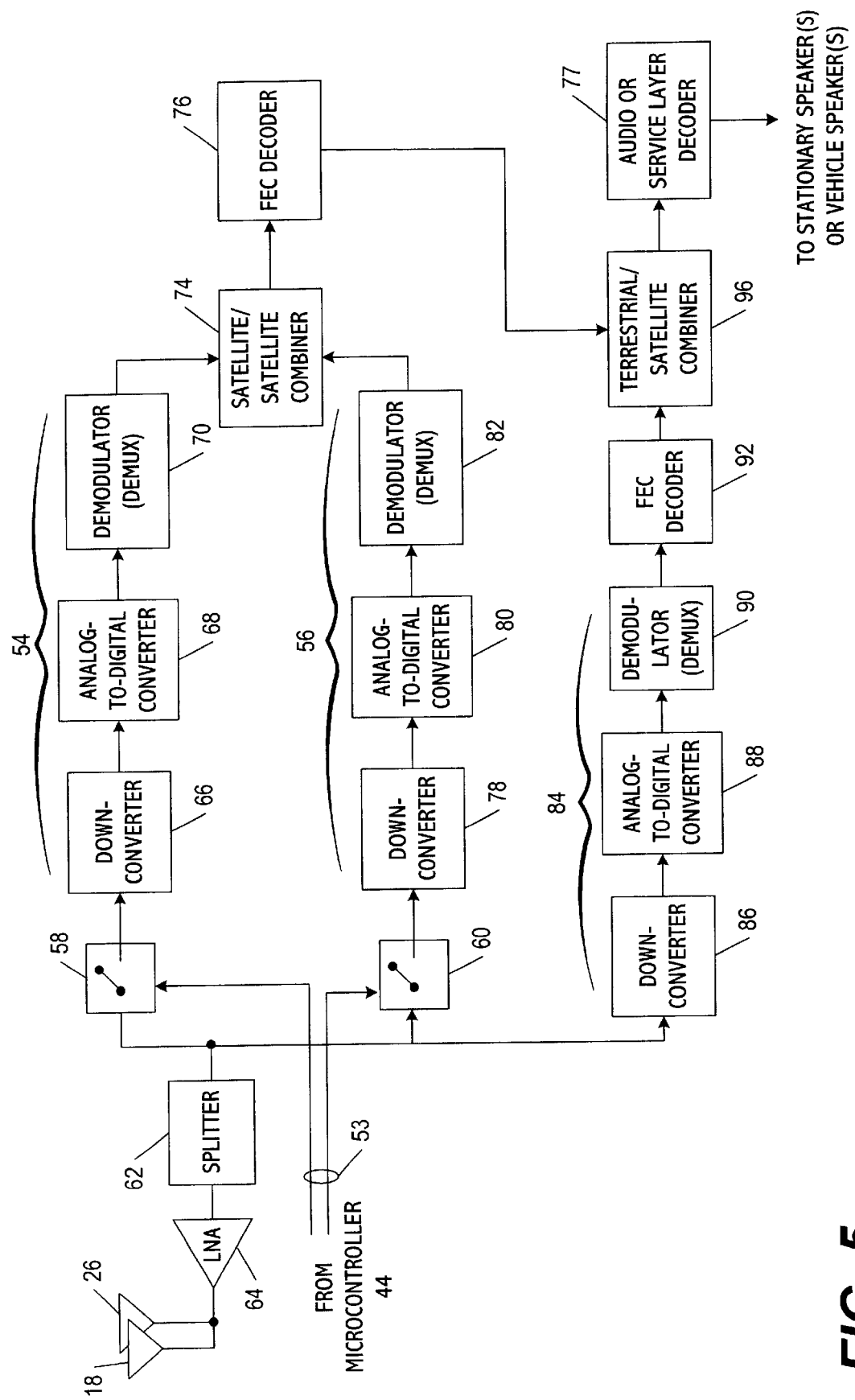
FIG. 5 is a block diagram of a three-arm satellite broadcast receiver for use with the satellite broadcast system depicted in FIG. 1 in accordance with an embodiment of the present invention.

FIG. 5 depicts an exemplary satellite receiver 50 having three receiver arms, that is, receiver arms 54 and 56 and a receiver arm 84 for processing signals received via a terrestrial repeater 17. The arm 84 receives signals from a received satellite broadcast via the splitter 62. A downconverter 86 and an ADC 88 and a demodulation device 90 are provided which operate in substantially the same manner as those described above in connection with the satellite receiver arms 54 and 56. The demodulation device 90, however, can employ a different demodulation method if the modulation method used at the terrestrial repeater 17 differs from that used for the satellite broadcast signals. The demodulated stream is processed by an FEC decoder 92. The outputs of the FEC decoder 92 and the FEC decoder 76 are combined via the terrestrial-satellite combiner 96 prior to being decoded by the audio or service layer decoder 77.

The embodiments of the present invention exemplified by FIGS. 6 and 7, respectively, operate with receiver components which are implemented as an integrated circuit (IC) hereinafter referred to as a channel decoder IC 100. For exemplary purposes, the IC 100 is illustrated as having three receiver arms 54, 56 and 84, as described above with reference to FIG. 5. The IC 100 preferably comprises the corresponding downconverters 66, 78 and 86, and the ADCs 68, 80 and 88 for each receiver arm 54, 56 and 84, as indicated by the RF front end devices 102 and 104 for satellite and terrestrial signal processing, respectively. The IC 100 also comprises the demodulators 70, 82 and 90 for each receiver arm and the baseband processing devices, as indicated at 106 (e.g., the combiners 74 and 96, the FEC decoders 76 and 92, and the service layer decoder 77).

Figure 6:
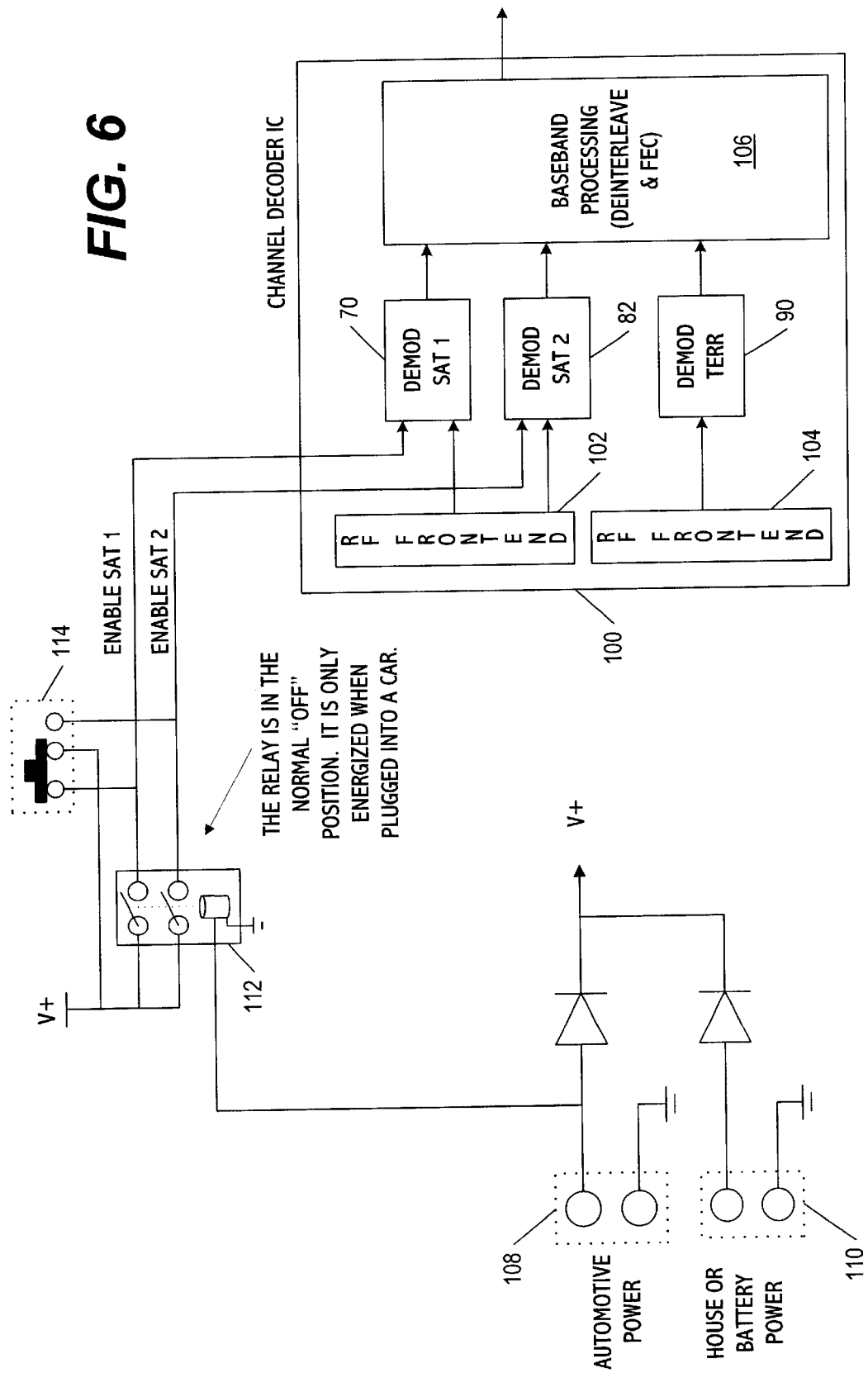
FIG. 6 is a schematic diagram of an operating mode detection device in accordance with an embodiment of the present invention.

As shown in FIG. 6, receptacles 108 and 110 are provided on the receiver unit 14. The receptacle 108 is connected to the coil of a relay 112, the contacts of which are normally open or in the OFF position. When the contacts are closed, a voltage is applied to the outputs from the relay 112 which are connected to respective ones of the demodulators 70 and 82. When an automotive power source (e.g., a car battery) is connected to the receptacle 108, the relay is actuated and enables both of the demodulators 70 and 82. When a house or consumer battery (e.g., 9 volts or less) input is connected to the receptacle 110, the relay is not actuated and the contacts remain in the OFF position. A selector switch 114 is provided which allows a user to selectively enable only one of the demodulators 70 or 82 and therefore only one of the receiver arms 54 or 56 for satellite signals.

Figure 7:
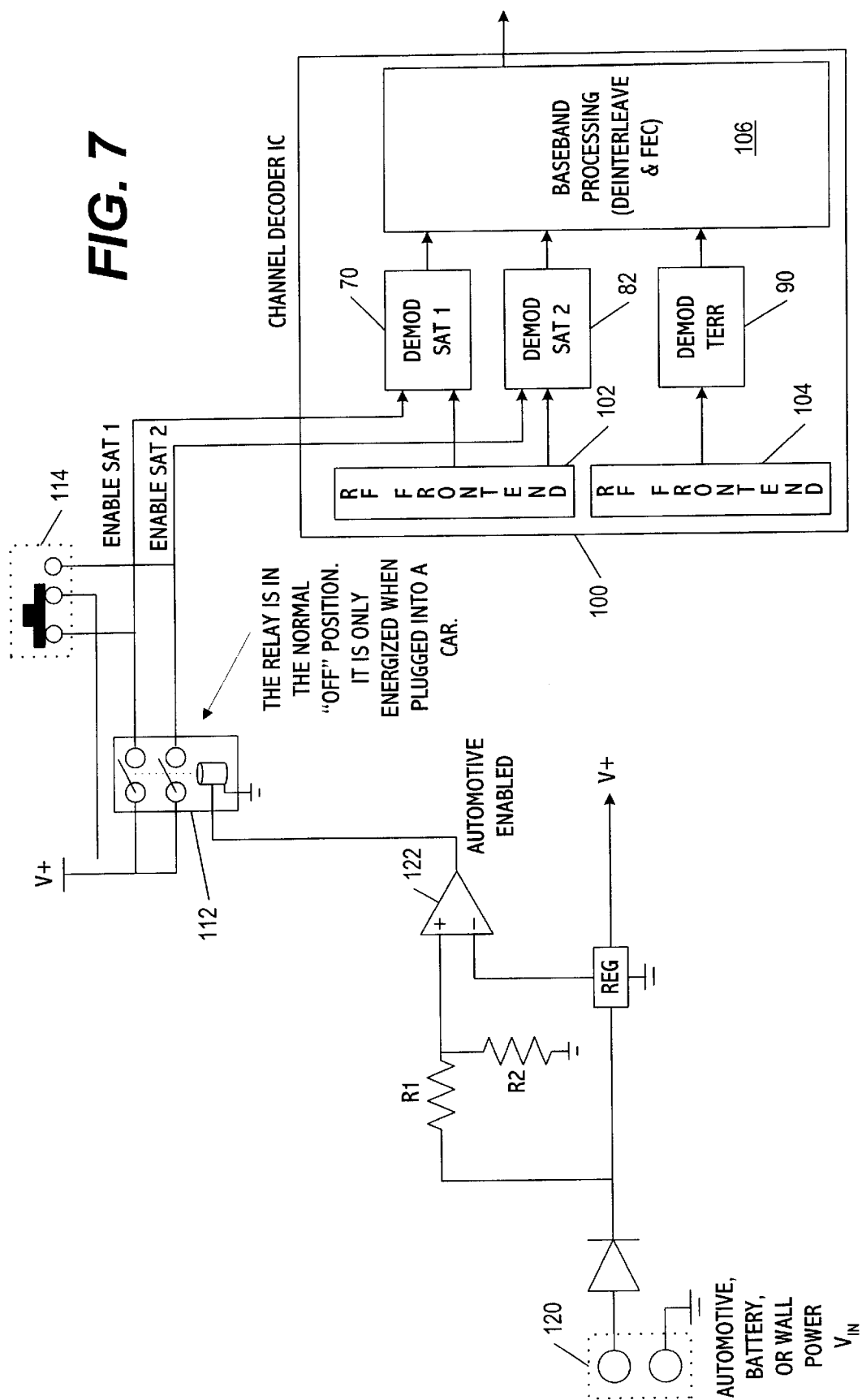
FIG. 7 is a schematic diagram of an operating mode detection device in accordance with an embodiment of the present invention.

With reference to FIG. 7, another embodiment of the present invention is depicted which comprises the IC 100, the relay 112 and the selector switch 114 described above with reference to FIG. 6; however, only one receptacle 120 is provided in lieu of two independent receptacles 108 and 110 for the supply of automotive or household/battery power to the receiver unit 14. The receptacle 120 can be configured to have a number of different types of plugs or sockets to accommodate connections to different types of power sources. A single output, however, is connected to a comparator 122. In the illustrated example, V+ is assumed to be 5 volts. An automotive power source such as a car battery is typically 12 volts or more, and household power or consumer battery sources are typically 9 volts.

With continued reference to FIG. 7, the comparator 122 is selected to trigger (e.g., go high) when the voltage on its positive input terminal (V+) is greater than the voltage on the negative input terminal thereof. If resistors R1 and R2 are both 10 kilo-ohms (k), then $V_{REF}$ is one-half the power source input voltage $V_{IN}$. Thus, when the input voltage $V_{IN}$ exceeds 10 volts, as for automotive battery power, the $V_{REF}$ value becomes more positive than the V+ value. The output signal from the comparator 122, that is, the mobile mode enabled signal, is true (e.g., goes high) and therefore energizes the relay 112 to enable the demodulators 70 and 82 in both of the receiver arms 54 and 56. The receiver unit 14 is therefore operable in the mobile use mode when connected to an automotive power source. When the input voltage $V_{IN}$ is less than 10 volts, as in the stationary mode, the $V_{REF}$ value becomes less than V+ on the comparator 122. Accordingly, the mobile mode enabled signal is false (e.g., remains low). Only one of the demodulators 70 and 82 can therefore be enabled using the selector switch 114.

It is to be understood that the receiver unit 14 can be implemented differently than with an IC 100 and that receiver arm disabling devices be configured for use in different places along the processing paths of the receiver arms 54 and 56 or other components of the satellite receiver 50 than at the demodulators, as shown in FIGS. 6 and 7. For example, FIGS. 4 and 5 both depict the exemplary use of switching devices 58 and 60 in the receiver arms 54 and 56. The switching devices 58 and 60 can be controlled, for example, by the microcontroller 44 to selectively open or close the connection of the corresponding arm 54 and 56 to the output of the splitter 58. The switching devices can also be independently operated using a relay, comparator, or other type of device.

Figure 8:
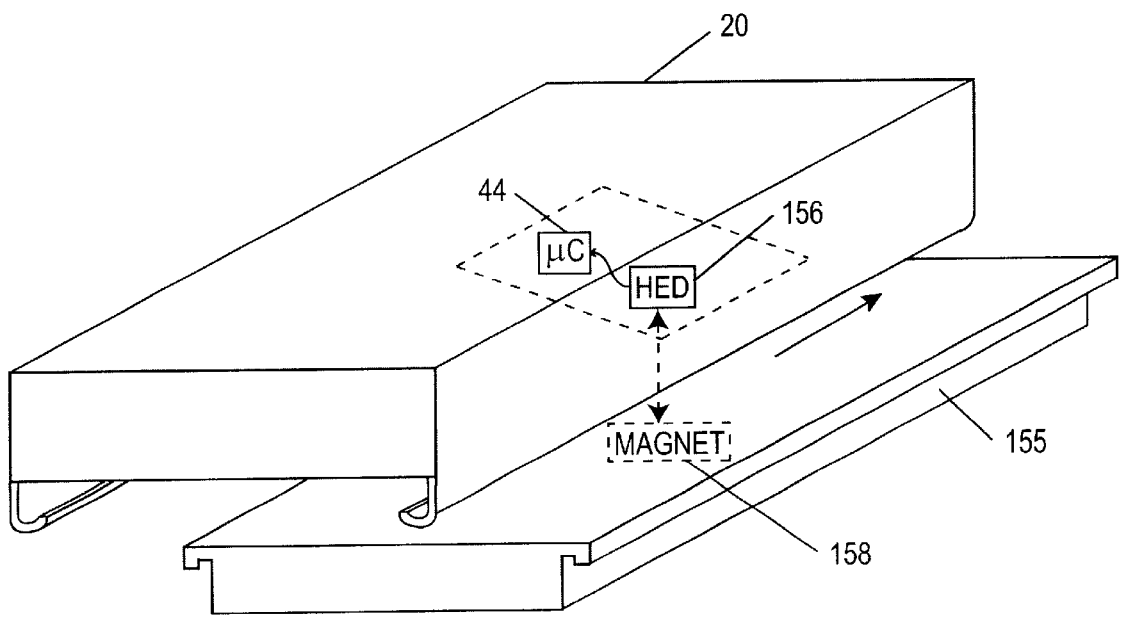
FIG. 8 illustrates an operating mode detection device in accordance with an embodiment of the present invention.

Different operating mode detection devices will now be described for providing input signals to the microcontroller 44 or otherwise independently enabling a selected one or both of the satellite receiver arms 54 and 56 in the satellite receiver 50 in accordance with the present invention. These devices will be described in connection with FIGS. 2 and 8. While several of these devices are illustrated for use with one receiver unit 14 in FIG. 2, it is to be understood that the receiver unit 14 need only be equipped with one such device to operate in accordance with the present invention.

In accordance with one method for detecting whether the receiver unit 14 is operating in a stationary or mobile environment, the antenna 18 is removably attached to the chassis 20. The chassis is provided with an antenna port 130 for receiving the detachable stationary receiver antenna 18. The antenna port 130 is provided with a sensing device 132 such as a mechanical, magnetic, electromagnetic, semiconductor, electronic or other type of switch or detector to detect when the end of the coaxial cable or other conductor connected to the receiver antenna 18 has been inserted into the port 130. The sensing device 132 provides an output signal which can be used by the microcontroller 44 or another device (e.g., relay) to disable one of the receiver arms 54 or 56 (e.g., the arm that provides the weakest signal). The antenna 26 is also preferably removably attached to the chassis 20 at a port 134. The sensing device 132 can be provided at the port 134, as opposed to the port 130. Accordingly, the receiver unit 12 can be configured to operate in the stationary mode until the end of the coaxial cable or other conductor connected to the antenna 26 is connected to the port 134. If desired, sensing devices 132 can be provided at both of the antenna ports 130 and 134.

The chassis 20 is provided with an AC power port 136 and a fixed power cord 138 extending between the AC power port 136 and an AC power outlet 139. In accordance with another embodiment of the present invention, the power cord 138 is detachable, and a sensing device 140 such as a mechanical, magnetic, electromagnetic, semiconductor, electronic or other type of switch or detector is provided at the port 136. The microcontroller 44 is programmed, or another device such as a relay is configured, to operate the receiver unit 14 in a stationary mode (i.e., to disable one of the receiver arms 54 and 56) when the sensing device 140 detects the presence of the power cord 138 at the port 136.

As shown in FIG. 2, the chassis 20 is also provided with a DC power supply port 142. The receiver unit 14 of the present invention can be used in conjunction with a DC power supply cord 144 having an adapter 146 at one end therefor which is configured for insertion in the cigarette lighter receptacle or auxiliary power socket 150 provided in most vehicles. Accordingly, the sensing device 140 can be located proximally with the port 142 to determine if a DC power supply is being used and therefore if the receiver unit 14 is operating in a mobile environment.

In accordance with another embodiment of the present invention, the chassis 20 is provided with a manual switch button 152 that can be operated by a user to select an operating mode. The button 152 can provide an input signal to the microcontroller 44 to disable one of the receiver arms 54 or 56 when activated (e.g., operating one of the switching devices 58 or 60). Alternatively, the button 152 can be used to complete a path between the input of a relay or similar device and a voltage source for actuation. The output of the relay or similar device can then be used as an enabling or disabling signal for one of the satellite receiver arm components.

The receiver unit 14 can also be provided with a motion sensing device 154 having an output connected, for example, to the microcontroller 44 to detect when the receiver unit 14 is being used in a mobile environment. The motion sensing device 154 can be an accelerometer, a sensor associated with the tachometer of the vehicle or other transit measuring device. In addition, the motion sensing device can be an encoding compass or heading indicator, an encoding gyroscope, a mercury switch, or a vibration sensor selected to have a sensitivity to distinguish between idle and vehicle motion.

In accordance with another aspect of the present invention, the receiver unit 14 is operated in conjunction with a pedestal base 155 that can be installed on the dashboard of a vehicle. The receiver unit 14 can be provided with a proximity sensing device 156 such as a Hall effect device (HED). The base can be provided with a magnet 158 which actuates the HED 156 when the portable receiver is mounted on the base in the vehicle. The microcontroller 44, for example, can be programmed to operate the receiver unit 14 in a stationary mode (e.g., using only the arm 54 or 56 which provides the strongest satellite signal output) until actuation of the HED. The microcontroller 44 then operates the receiver unit 14 in a mobile operating mode until the microcontroller receives an indication that the receiver unit has returned to stationary use. Alternatively, the pedestal base can be configured to provide a circuit path to complete the connection of the antenna 26 to the receiver unit. The sensor 134 in FIG. 2 can then detect when the antenna 26 is configured to allow use of the receiver unit in a mobile environment using both receiver arms 54 and 56.

As stated previously, the mode sensing device can be implemented as a device that detects differences in voltage and current characteristics of batteries or other power sources used in the receiver unit and in a vehicle electrical system. Alternatively, the receiver unit 14 can be provided with a device to dynamically measure the power level of a received satellite signal. If the signal power level is relatively constant, then the receiver unit 14 is determined by the microcontroller 44 to be operating in a stationary environment. The receiver unit 14 can also be configured to monitor signal strength to determine if a second satellite signal is needed. If the received signal strength drops below a predetermined level, then the non-operating arm 54 or 56 is activated. In addition, an input signal generated by the vehicle playback interface 42 can be provided to the microcontroller 44 to indicate that the receiver unit 14 is operating in a mobile environment.

Although the present invention has been described with reference to certain preferred embodiments thereof, it will be understood that the invention is not limited to the details thereof. Various modifications and substitutions have been suggested in the foregoing description, and others will occur to those of ordinary skill in the art. All such modifications and substitutions are intended to be embraced within the scope of the invention as defined in the appended claims.

What is claimed is:

1. A method of operating a receiver in a satellite broadcast system, the receiver having a first receiver arm for processing signals from a first satellite and a second receiver arm for processing signals from a second satellite, the method comprising the steps of:

provicing a first circuit path between a first receiver arm and a first satellite antenna that is configured to be nonconductive when incomplete and to become conductive and allow a signal from said first satellite antenna to be provided to said first receiver arm when complete;

providing a second circuit path between a second receiver arm and a second satellite antenna that is configured to be nonconductive when incomplete and to become conductive and allow a signal from said second satellite antenna to be provided to said second receiver arm when complete;

completing said first circuit path and not said second circuit path when said receiver is stationary; and completing said first circuit path and said second circuit path when said receiver is mobile.

2. A method as recited in claim 1, further comprising the steps of:

operating a switch having a first switch position and a second switch position to select between stationary receiver operation and mobile receiver operation, respectively;

completing said first circuit path and not said second circuit path when said switch is in said first position; and completing said first circuit path and said second circuit path when said switch is in said second position.

3. A method as recited in claim 1, wherein said first circuit path is configured to be complete and further comprising the steps of:

operating a switch having a first switch position and a second switch position to select between fixed receiver operation and mobile receiver operation, respectively; and completing said first circuit path and said second circuit path when said switch is in said second position.

4. A method as recited in claim 1, further comprising the steps of:

operating a motion sensing device to detect when said receiver is being used in a mobile environment;

completing said first circuit path and not said second circuit path when said receiver is not being used in said mobile environment; and completing said first circuit path and said second circuit path when said receiver is being used in said mobile environment.

5. A method as recited in claim 1, wherein said first circuit path is configured to be complete and further comprising the steps of:

operating a motion sensing device to detect when said receiver is being used in a mobile environment; and completing said second circuit path when said receiver is being used in said mobile environment.

6. A method as recited in claim 1, wherein said first circuit path is configured to be complete, and said second circuit path is selectively completed whenever said receiver is used for mobile operation.

7. A method as recited in claim 1, wherein said receiver is adapted to slide into a base unit provided in a vehicle for mobile operation and further comprising the steps of:

providing a Hall effect sensing device in one of said receiver and said base unit and a magnet in the other of said receiver and said base unit to detect when said receiver is in said base unit; and completing said first circuit path and said second circuit path when said receiver is in said base unit.

8. A method as recited in claim 1, wherein said first circuit path is configured to be complete, and said receiver is adapted to slide into a base unit provided in a vehicle for mobile operation and further comprising the steps of:

providing a Hall effect sensing device in one of said receiver and said base unit and a magnet in the other of said receiver and said base unit to detect when said receiver is in said base unit; and completing said second circuit path when said receiver is in said base unit.

9. A method as recited in claim 1, wherein said completing step for completing said first circuit path and not said second circuit path comprises the steps of:

receiving a signal indicating that said second satellite antenna is preferred over said first satellite antenna when said receiver is stationary; and completing said second circuit path in lieu of said first circuit path.

* * * * *